Figure 1A:
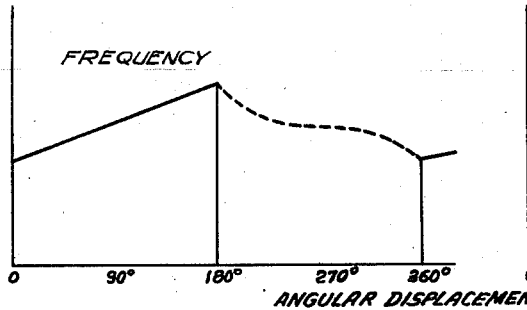

Nov. 24, 1942.   E. LABIN ET AL   2,303,214
CONDENSER
Filed July 10, 1941

INVENTORS
EMILE LABIN — DEVEREAUX MARTIN
BY
ATTORNEY

Patented Nov. 24, 1942

2,303,214

UNITED STATES PATENT OFFICE 2,303,214

CONDENSER

Emile Labin, New York, N. Y., and Devereaux Martin, Fairlawn, N. J., assignors to International Telephone & Radio Manufacturing Corporation, Newark, N. J., a corporation of Delaware Application July 10, 1941, Serial No. 401,710

4 Claims. (Cl. 250—40)

Our invention relates to certain improvements in condensers.

It is an object of the invention to provide improved means for aiding the scanning of a band of frequencies.

Another object is to provide a variable condenser that will have a substantially square law capacitance characteristic with angular displacement, said characteristic varying progressively in one sense for substantially a complete cycle of controlled plate variation.

A further object is to provide variable capacitance means for producing a generally saw-toothed capacitance characteristic.

Other objects and various further features of novelty and invention will hereinafter be pointed out or will become apparent from a reading of the following specification in conjunction with the drawing included herewith. In said drawing—

Figure 1B:
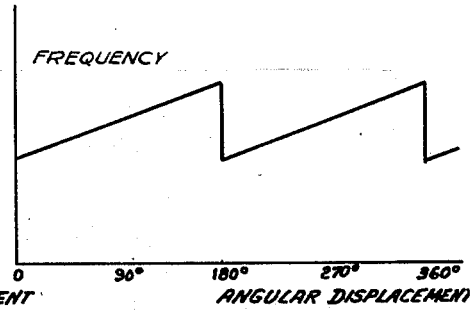
Figure 2:
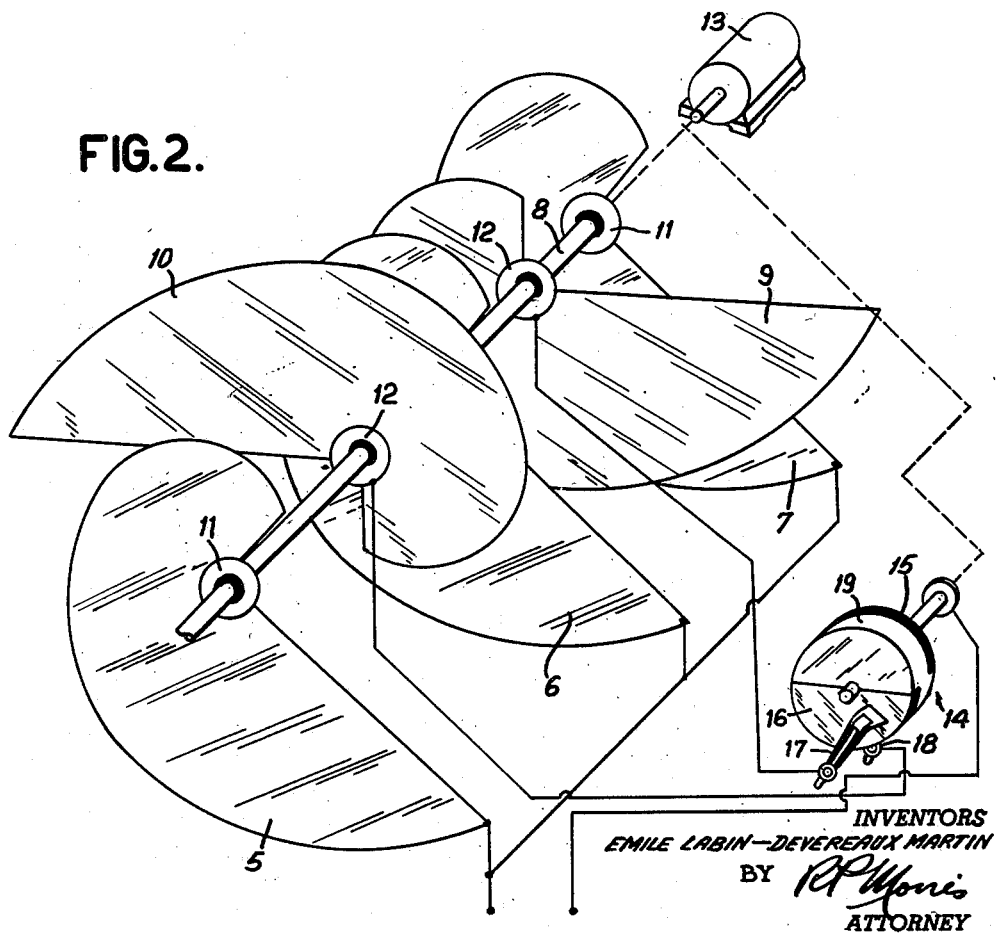

Figs. 1a and 1b are graphical representations of characteristics of comparative condensers; and Fig. 2 is a generally isometric schematic layout of a condenser in accordance with features of the invention.

It is known that a band of frequencies may be scanned and that indicating apparatus may be provided appropriately responsive to such scanning whereby it will be possible to determine the transmission or carrier frequency of a transmitter within range of the apparatus. In such receiving equipment it is usual to provide a variable condenser associated, say, with the radio-frequency tank circuit. These condensers are usually rotary and are rotated at a constant speed, whereby the receiver is periodically tuned up and down within a relatively large band of frequencies. It has been proposed that this sort of condenser be employed in conjunction with various kinds of indicating apparatus, of which the cathode ray tube having a linear sweep, say horizontal, seems most preferable. In employing a cathode ray tube for this purpose it is suggested that the sweep circuit energy be synchronized with a scanning operation of the condenser; and if a condenser of the above-mentioned type is employed, it is necessary to have the cathode ray sweep circuit operate to deflect the ray from one extreme position to another and back again, each trip being at the same speed so as to maintain correct synchronism with the condenser tuning.

Fig. 1a shows graphically the kind of capacitance variation with angular displacement that is characteristic of a common variable condenser designed to give a linear frequency tuning control throughout 180° of rotation. It will be observed, however, that it is only possible to obtain this linear relationship of capacitance and angular displacement over a fraction, usually one half, of a complete revolution of the rotor plates, shown by the solid line in Fig. 1a. Moreover, it is to be noted that the remaining portion of the characteristic is so decidedly non-linear as to be of no practical use for the purposes of the present application thereof.

Now, if this type condenser be employed in frequency scanning as outlined above and if a transmitter within range is operating, there will be some angular position (within the first 180°) of the condenser which will tune the receiver so as to be responsive to such transmission. At the instant that the receiver is so responsive there will be an instantaneous surge of energy in the receiver, and by well known means this energy may be utilized to deflect the sweeping beam to give an indication of the received carrier frequency. It will be observed that if the indication made upon a sweep through the first 180° is to coincide with one to be made on the return sweep, there must be some relation or correspondence between the dotted non-linear portion of the curve of Fig. 1a and operation of the sweep circuit. Such design of the sweep circuit, while possible, is considered impractical; and, in a preferred alternate arrangement, keying or other means are provided for rendering received energy ineffective upon the indicating tube during the second 180° or non-linear portion of the condenser characteristic. An evident disadvantage of the latter preferred system is that there will only be one half the number of surges effective upon the cathode ray screen, with a resultant decrease in brilliance of the reading.

In accordance with features of the invention we provide a condenser that will furnish linear frequency scanning throughout a complete revolution of the rotor, whereby maximum indicating signal surges may be obtained. To this end, we provide a condenser having plate means linearly effective as in the case of the first 180° of Fig. 1a, and one half of said means is displaced as to its effectiveness 180° from the other half. Referring to the schematic arrangement of Fig. 2, a preferred form of our condenser comprises a series of spaced stator plates 5, 6, 7 of generally logarithmic shape, for linear frequency tuning characteristic purposes. A shaft 8 bears rotor plates 9 and 10 and is journalled in bushings 11 on the stator plates for free rotation with respect thereto.

Rotor plates 9 and 10 may be securely anchored to shaft 8 by appropriate collar means 12. In accordance with features of the invention plates 9 and 10 are staggered in phase opposition in their relationship on shaft 8. Electrical connection to each of these plates (9 and 10) may, of course, be made by any known means, as for instance by slip rings, details of which are not shown. It will be observed that, as shaft 8 is rotated, say by a motor 13, the resultant capacitance characteristic of plate 9 and its cooperating plates will be the same as that of plate 10 and its cooperating plates except as to its 180° displacement therefrom.

As above outlined, we provide means for rendering these two characteristics alternately effective. In the form illustrated commutator means 14 is employed for this purpose. Connections are provided between plate 9 and a contact arm 17 for segment 16, and between plate 10 and contact arm 18 for segment 15. The commutator block shown comprises two semi-circular conductive segments 15 and 16, set in a non-conductive medium 19 and preferably so designed and disposed that there will be no overlap in effectiveness of both rotor plates and also so that there will be no interval between the alternate effectiveness of plates 9 and 10. In a preferred arrangement commutator block 14 is rotated synchronously with shaft 8 and may even be mounted thereon.

The overall characteristic of the condenser just described is represented in Fig. 1b alongside that representative of prior arrangements (Fig. 1a). It will be noted that a square law capacitative change is always provided and that, when the commutator is well designed the interval of plate change-over may be negligibly small. A very clear saw-toothed characteristic is thus obtained, and the frequency-sweeping purposes indicated may be served to best advantage.

Although the invention has been described in particular detail in connection with the plate and commutator embodiment shown, it is not to be considered as limited thereto. The commutator, for example, is merely illustrative of function, and electronic or other means may prove more satisfactory. Furthermore, my novel condenser may be formed from two similar standard devices, provided that respective shafts are rotated synchronously and rotor plates are in opposition.

It is also to be understood that the invention is not to be considered as merely applicable to the frequency sweeping scheme outlined. Conceivably, it may be employed very effectively wherever a saw-toothed wave is desired.

It is further clear that the invention is not limited to a capacitance variation only twice during a rotor revolution. Of course, three, four, and as many more evenly staggered rotor plates as desired could be employed. Appropriate commutation would then yield as many capacitance variations per revolution as there are staggered rotor plates.

A further application of the invention that will at once suggest itself to those skilled in the art is as to distance-determining apparatus, particularly the frequency wobbling aircraft altimeter. In such an application, a condenser in accordance with the invention may be employed in the transmitter to generate a generally sawtoothed recurring variation in frequency. Another of our condensers in the receiver and operated synchronously with the transmitter condenser would make the receiver responsive to the beat frequency of received reflected energy and transmitted energy, whereby altitude indications may be obtained in a well-known manner.

What is claimed is:

1. In a frequency scanning arrangement, a variable condenser comprising two single rotor plates of identical form and cooperating stator plate means, one of said rotor plates being angularly displaced by 180° with respect to the other plate of said rotor plates, a pair of terminals for connection to an external circuit, means for connecting one of said terminals permanently to said stator plate means, commutator means for connecting said one and said other plates alternately to said other terminal, and means for rotating said rotor plates at a constant speed.

2. In a frequency varying system, a variable condenser comprising N identical rotor plate means each including at least one plate and stator plate means, said stator means being aligned, and said N rotor plate means being angularly displaced from each other by 1/N of 360°, a pair of terminals for connection to an external circuit, means for connecting one of said terminals permanently to said stator plate means, commutator means for connecting said N rotor plate means successively to said other terminal, and means for rotating said rotor plate means at a constant speed.

3. A condenser according to claim 2, in which said plate means are of a generally logarithmic spiral shape.

4. A condenser according to claim 2, in which said commutator means comprises a commutator including as many conductive segments as there are displaced sets of rotor plates, and each of said segments being effective over an equal fraction of a revolution of said commutator.

EMILE LABIN.
DEVEREAUX MARTIN.